United States Patent

(12) United States Patent
Oswald et al.

(10) Patent No.: US 8,004,555 B2
(45) Date of Patent: Aug. 23, 2011

(54) METHODS AND DEVICES FOR SIMULTANEOUS DUAL CAMERA VIDEO TELEPHONY

(75) Inventors: Gary J Oswald, Elk Grove Village, IL (US); Rafael Camargo, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1295 days.

(21) Appl. No.: 11/421,257

(22) Filed: May 31, 2006

(65) Prior Publication Data

US 2007/0279482 A1 Dec. 6, 2007

(51) Int. Cl.
*H04N 7/14* (2006.01)

(52) U.S. Cl. .................................. 348/14.01; 455/556.1

(58) Field of Classification Search ................ 455/556.1; 348/14.01
See application file for complete search history.

(56) References Cited

U.S. PATENT DOCUMENTS

| | | | |
|---|---|---|---|
| 5,956,081 A | 9/1999 | Katz et al. | |
| 6,466,202 B1 | 10/2002 | Suso et al. | |
| 6,753,899 B2 | 6/2004 | Lapalme et al. | |
| 6,876,379 B1 * | 4/2005 | Fisher | 348/14.02 |
| 7,366,540 B2 * | 4/2008 | Ansari et al. | 455/556.1 |
| 7,443,447 B2 * | 10/2008 | Shirakawa | 348/376 |
| 2003/0169289 A1 * | 9/2003 | Holt et al. | 345/735 |
| 2004/0145675 A1 | 7/2004 | Kitada | |
| 2004/0197011 A1 * | 10/2004 | Camus et al. | 382/103 |
| 2005/0046740 A1 | 3/2005 | Davis | |
| 2005/0083399 A1 * | 4/2005 | Shinkai | 348/14.01 |
| 2006/0044399 A1 | 3/2006 | Fredlund et al. | |
| 2006/0105806 A1 * | 5/2006 | Vance et al. | 455/556.1 |
| 2008/0188262 A1 * | 8/2008 | Goebel et al. | 455/556.1 |

* cited by examiner

*Primary Examiner* — Curtis Kuntz
*Assistant Examiner* — Maria El-Zoobi
(74) *Attorney, Agent, or Firm* — Gary J. Cunningham

(57) ABSTRACT

Disclosed are mobile communication devices, and methods for mobile communication devices including two video cameras that can operate simultaneously and in real-time. The device includes a first video camera pointing in a first direction and configured to generate a first video signal and a second video camera pointing in a second direction and configured to generate a second video signal. The device includes a processor configured to receive the first video signal and the second video signal and to encode the first video signal and the second video signal for simultaneous transmission. Disclosed is another device, including a housing having a fixed first video camera configured to point in a first direction with respect to the housing and generate a first video signal and a movable second video camera configured to point in a plurality of second directions with respect to the housing and generate a second video signal.

16 Claims, 4 Drawing Sheets

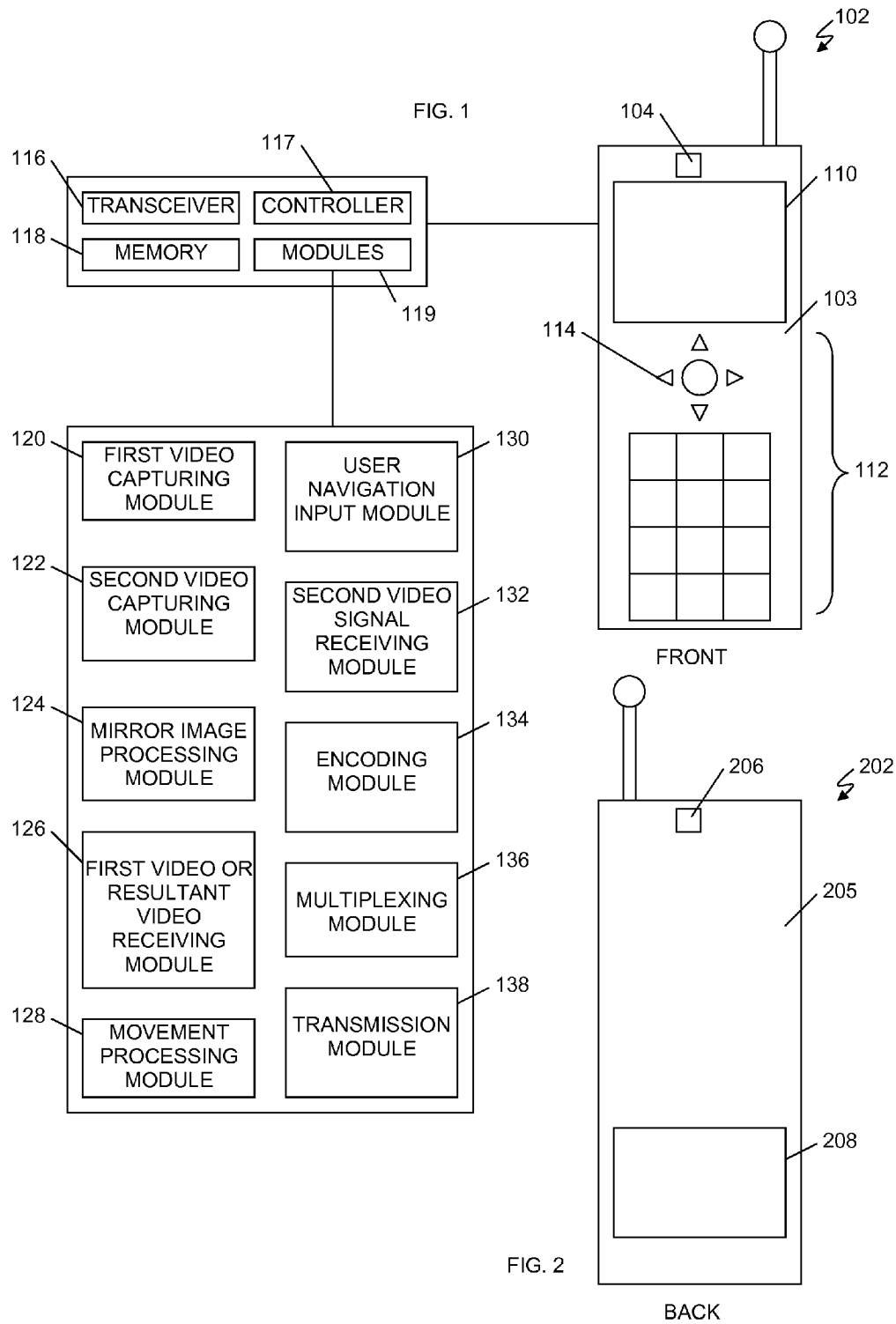

METHODS AND DEVICES FOR SIMULTANEOUS DUAL CAMERA VIDEO TELEPHONY

FIELD

The present disclosure relates to video capture in mobile communication devices, and more particularly to methods and devices to provide simultaneous dual camera video telephony in a mobile communication device.

BACKGROUND

Manufactures of hand held devices, including those of mobile communication devices, are increasingly adding functionality to their devices. For example, many mobile communication devices shipped today include cameras. Image capturing devices, such as still and digital video cameras, are being increasingly incorporated into handheld devices such as wireless communication devices. Users may capture still or video images on their wireless communication devices and transmit a file to a recipient via a network.

A still camera and a video camera in a single handheld device such as a mobile communication device may be used separately. That is, a video camera for video conferencing may be on the same surface as a display and a keypad including navigation input keys and therefore point in the direction of the user while the user views the display. The still camera may point away from the back of the device. In this manner, when taking a still photograph, the user may view on the display a digitally reproduced image of the user's object, much like the view screen of a stand alone digital camera. In a mobile communication device the still and video cameras may point in opposite directions from the device.

Since a mobile communication device can transmit data captured from a video camera in real-time to a recipient, it has many uses. However, when two video cameras would be more useful than one, a mobile communication device having a single video camera may not fill a user's needs in certain use cases. It would be advantageous if there were single device that included two video cameras that may be useful in a number of use-cases unique to mobile communication devices with a capability that cannot be achieved with single and separate and remote video cameras.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 depicts a mobile communication device having a front face and a first video camera thereon;

FIG. 2 depicts the back face of a mobile communication device having a second video camera;

Figure 3:
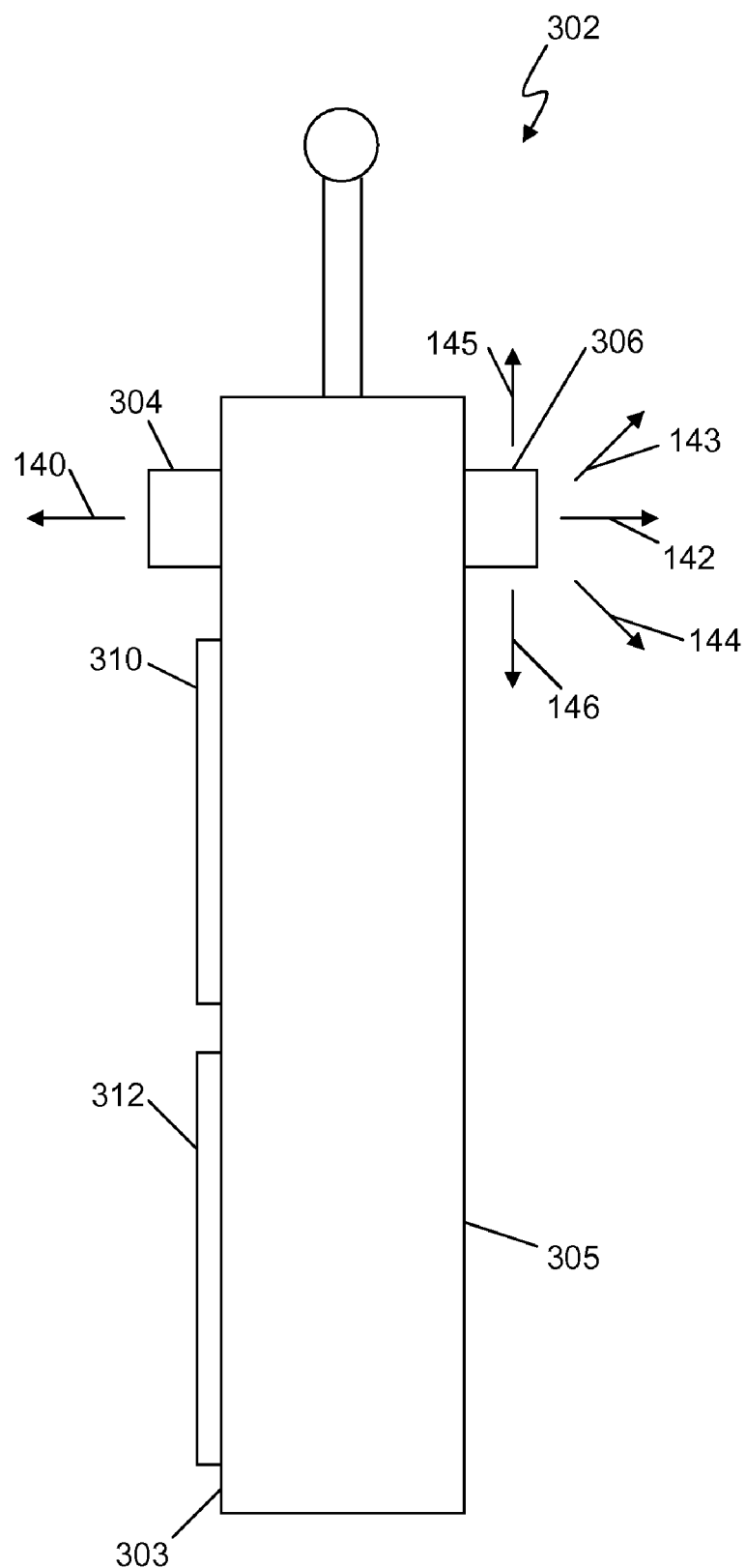
FIG. 3 depicts a side view of a mobile communication device showing a first video camera on its front face and a second video camera on it back face.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Disclosed are mobile communication devices, and methods for mobile communication devices including two video cameras that can operate simultaneously that may be useful in certain use cases. News reporting is one example of a use case. In news reporting, a reporter may arrive at a news scene prior to the arrival of other camera equipment. A mobile communication device having two video cameras having pointing directions 180° apart that operate simultaneously could allow a reporter to capture a sequence of images of the scene, and simultaneously capture a sequence of images of himself or herself describing the scene. In real-time the device can encode and transmit the two image sequence data streams simultaneously to a recipient that may be a news room. At the news room, the image data streams may be multiplexed. In another embodiment, the device may multiplex the image data streams prior to transmission so that the news room receives a single video data stream signal.

Disclosed is a mobile communication device including a first video camera pointing in a first direction and configured to generate a first video signal and a second video camera pointing in a second direction and configured to generate a second video signal. The mobile communication device includes a processor configured to receive the first video signal and the second video signal and to encode the first video signal and the second video signal for simultaneous transmission.

Disclosed is another mobile communication device, the device including a housing having a fixed first video camera configured to point in a first direction with respect to the housing and to generate a first video signal and a movable second video camera configured to point in a plurality of second directions with respect to the housing and to generate a second video signal.

Also disclosed is a method in a video telephony enabled mobile communication device including receiving a first video signal from a first video camera of the mobile communication device, receiving a second video signal from a second video camera of the mobile communication device, and encoding the first video signal and the second video signal for simultaneous transmission.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

FIG. 1 depicts a mobile communication device 102 having a front face 103 and a first video camera 104 thereon. Briefly turning to FIG. 2, that figure depicts the back face 205 of a housing of a mobile communication device 202 having a second video camera 206. The battery holder 208 typically on the back of a mobile communication device is also shown. As the device may be used, the first video camera 104 may take a close-up or detailed image of a specific object and in particular, a user's face. The second video camera 206 may take an image of the user's field of view. In this way, the capture of a sequence of images of a user's face describing a scene may be simultaneous with the capture of a sequence of images of the same scene. In one use case, the user can be an expert problem solving in the field.

The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The front face 103 of the mobile communication device 102 can include a display 110, a key pad 112 and a set of navigation keys 114 that can be considered part of the key pad 112. The device can include a transceiver 116, a controller or processor 117, memory 118 and modules 119. While represented as a single processor 117 of the device and a single memory 118 of the device, there may be a plurality of each in the device. Specifically, the first camera 104 and the second camera 206 (see FIG. 2) may have their own associated processors and memories.

Either a central processor 117 or the cameras processors can receive instructions from the modules 119. The modules 119 can include a first video capturing module 120, a second video capturing module 122, a mirror image processing module 124, a first video signal or resultant video signal receiving module 126, a movement processing module 128, a user navigation input module 130, a second video signal receiving module 132, an encoding module 134, a multiplexing module 136 and a transmission module 138. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

FIG. 3 depicts a side view of a mobile communication device 302 showing a first video camera 304 on its front face 303 and a second video camera 306 on its back face 305. The first video camera 304 and the second video camera 306 can be flush to the front face 303 and the back face 305 respectively. That they are extended from the device faces is for illustration purposes. The front face 303 is further depicted as similarly showing the display 310 and the keypad 312.

Further depicted in FIG. 3 is the pointing direction 140 of the first video camera 304 and a plurality of pointing directions 142, 143, 144, 145 and 146 of the second video camera 306. In one embodiment the second video camera has a fixed position so that pointing direction 142 is substantially 180° from that of pointing direction 140 of the first video camera. In another embodiment, the second video camera is moveable so that it can have a plurality of pointing directions, for example, 142, 143, 144, 145, and 146. Since FIG. 3 is in two dimensions, the pointing directions of the plurality of pointing directions that come out the page and go into the page are not shown. The pointing direction of the second video camera 306 can be manually and/or automatically changed as will be discussed in detail below.

Figure 4:
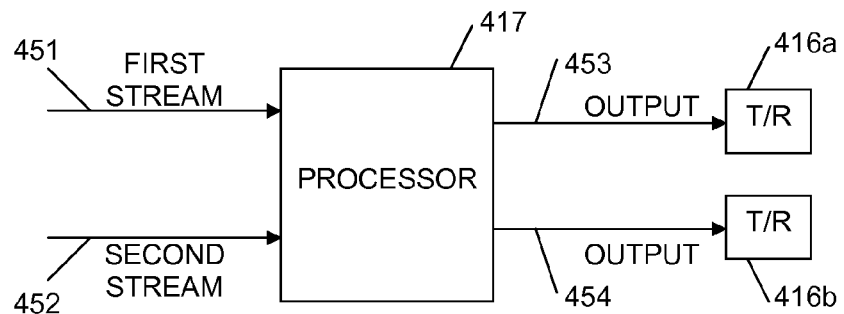
FIG. 4 illustrates encoding a first video signal and a second video signal for simultaneous transmission.

FIG. 4 illustrates encoding a first video signal and a second video signal for simultaneous transmission. As described above, the video telephony enabled mobile communication device depicted in FIGS. 1, 2 and 3 can include first video camera pointing in a first direction that is configured to capture a first sequence of images as a first video signal or first video stream and a second video camera pointing in a second direction that is configured to capture a second sequence of images as a second video signal or second video stream. In one embodiment, a processor 417 (also see 117, FIG. 1) can be configured to receive the first video signal 451 received from a first video camera and the second video signal 452 received from a second video camera. The output can be two streams 453 and 454 encoded for simultaneous transmission from one or more transceivers 416a and 416b.

Figure 5:
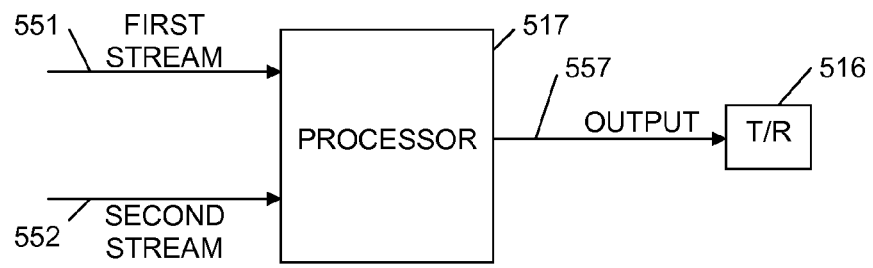
FIG. 5 illustrates multiplexing a first video signal and a second video signal for simultaneous transmission.

FIG. 5 illustrates multiplexing a first video signal and a second video signal. In this embodiment, a processor 517 (also see 117, FIG. 1) can be configured to receive the first video signal 551 received from a first video camera and encode it. The second video signal 552 can be received from a second video camera and encoded. The output can be a combined video stream 557 encoded for transmission from a transceiver 516.

The encoding process can deliver one or more output signals for transmission in real-time to a recipient in a ready to use format. The encoding instructions for transmission can be stored in a memory of the device. An encoding application can be achieved using a standard video encoder such as the ISO specified MPEG-4 Simple Visual Profile video encoder. MPEG-4 is the global multimedia standard, delivering professional-quality audio and video streams over a wide range of bandwidths, from cell phone to broadband. MPEG-4 was defined by the Moving Picture Experts Group (MPEG), the working group within the International Organization for Standardization (ISO). For the simultaneous dual camera video telephony application, two video signals are encoded simultaneously using standard video encoders. For example, the encoding instructions can provide an encoded signal that may be ready to broadcast by a news broadcasting station as it is received from the electronic device 102.

Figure 6:
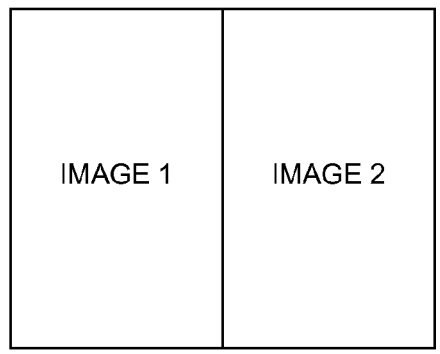
FIG. 6 illustrates display output of a combined video signal in a side-by-side format.
Figure 7:
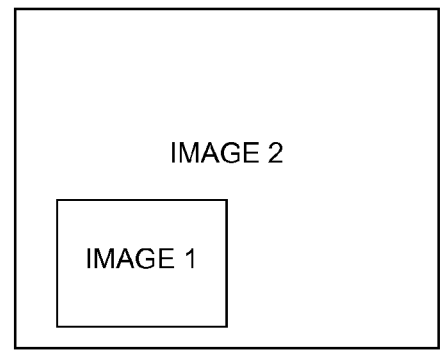
FIG. 7 illustrates display output of a combined video signal in a picture-in-picture format.
Figure 8:
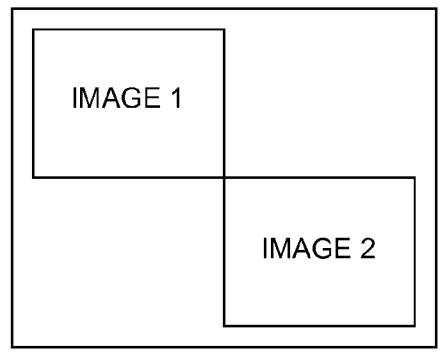
FIG. 8 illustrates display output of a combined video signal in a picture-next-to-picture format.

The multiplexing process can also generate a single video image having a particular format. FIG. 6 illustrates display output of a combined video signal in a side-by-side format. FIG. 7 illustrates display output of a combined video signal in a picture-in-picture format. FIG. 8 illustrates display output of a combined video signal in a picture-next-to-picture format. It is understood that a plurality of formats may be used to display the streaming video images.

A multiplexing application can be achieved using the standard Third Generation Partnership Project (3GPP; http://www.3gpp.org) specified 3G-324M system. The 3G-324M system is a derivative of the International Telecommunication Union (ITU) H.324 protocol standard for low-bitrate multimedia communication, which ITU-T developed for the public switched telephone network (PSTN). For the simultaneous dual camera video telephony application, two encoded video signals can be transmitted simultaneously using the 3G-324M system or any other standard video communication systems such as those achieved with the 3gpp IP Multimedia Call Control Protocol Based on Session Initiation Protocol (SIP) and Session Description Protocol (SDP).

Figure 9:
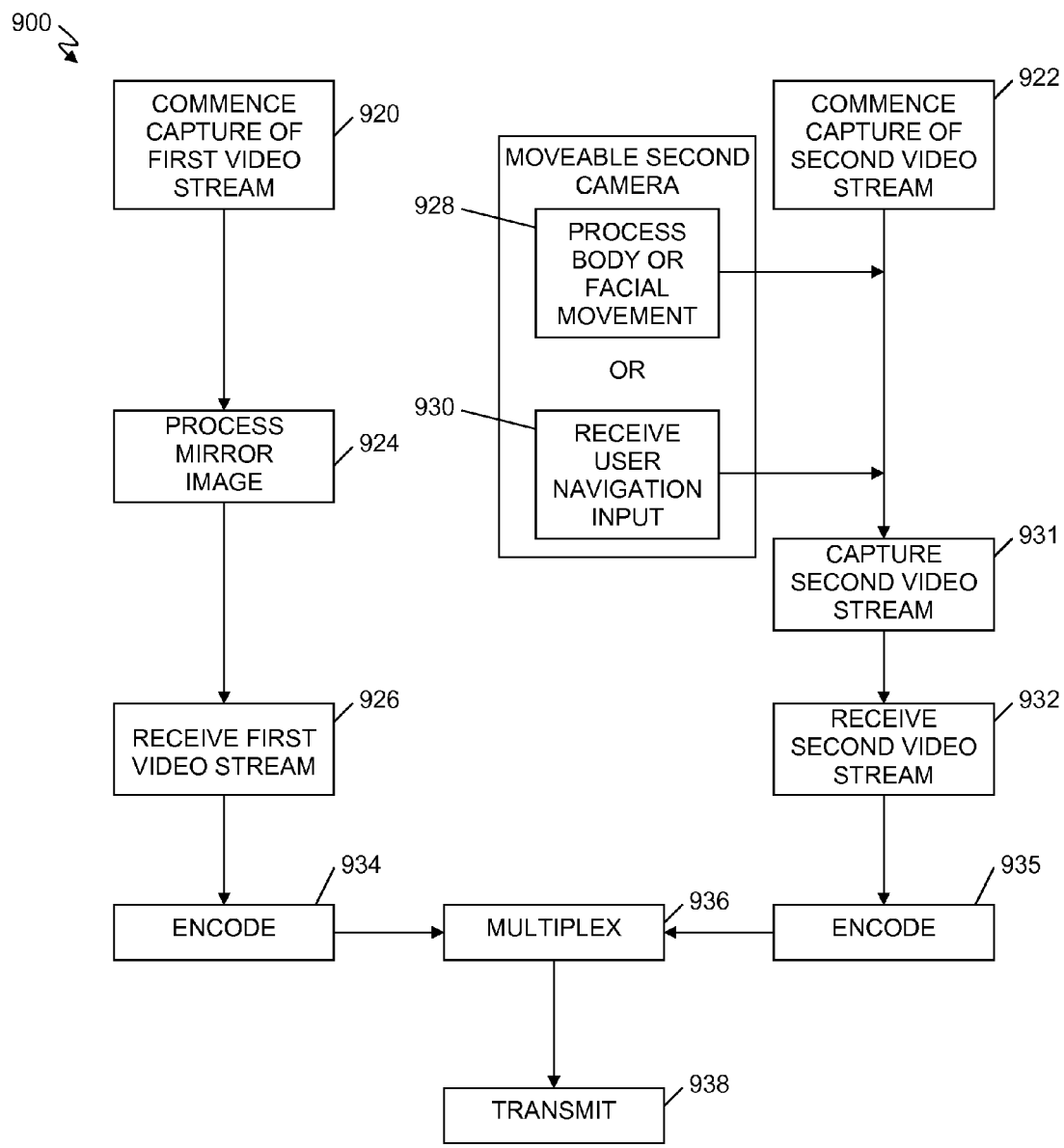
FIG. 9 is a flowchart of a method as described herein.

FIG. 9 is a flowchart of a method as described herein. A method 900 in a video telephony enabled mobile communication device includes commencing capturing a first video stream 920 and capturing a second video stream 922. Video capturing modules 120 and 122, for example, can provide instructions to processors of each camera to capture a sequence of images. One or more central processors can process instructions of the video capturing modules. It is understood that any combination of processors of the device 102 (see FIG. 1) is within the scope of this discussion.

FIG. 9 in general follows the process shown in FIG. 5 that is, providing a single encoded and multiplexed output signal for transmission. However, in another embodiment similar to that shown in FIG. 4, the two signals are not multiplexed and two signals are separately encoded for transmission. Different or fewer steps than are shown in the method flowchart of FIG. 9 can of course take place. It is understood that any order and/or combination of steps, including additional steps that are not shown are within the scope of this discussion.

Briefly retuning to FIG. 3, there is shown both the front face 303 and the back face 305 illustrating the opposite pointing directions. In delivering two video image sequences multiplexed into a single signal as described above, the first image taken by the first video camera 304 that is on the front face 303 and typically having a pointing direction in the direction of the user can have the opposite orientation of the second image taken by the second video camera 306 that is on the back face 305 of the device. Accordingly, a processor, either of the first video camera or a central processor can be configured to provide from the first video signal a resultant video signal 924 (see FIG. 9) corresponding to a mirror image of the captured first video image according to instructions of the mirror image processing module 124 (see FIG. 1). That resultant video signal may be received by the processor 926 in place of the first stream 451 (see FIG. 4) and first stream 551 (see FIG. 5) according to instructions of the first video signal or resultant video signal receiving module 126 (see FIG. 1). When a multiplexed image signal 557 (see FIG. 5) is received in a format such as that depicted in FIGS. 6, 7 and 8, or any other suitable format, the user's image and the scene's image can have the same orientation.

Applications for providing a mirror of the sequence of images can include locally providing the self-view to the user of the standard video telephony or video capture applications. For the simultaneous dual camera video telephony application, the first video signal of the user is mirrored so the body gestures and eyes are pointing in the proper direction of the events of the second video signal as required by the recipient viewing both video signals simultaneously.

As discussed above, in one embodiment the second video camera 206 (see FIG. 2) may be in a fixed position in the housing having a single pointing direction, or in another embodiment it may be moveable with respect to the housing, having a plurality of pointing directions. In the event that the second video camera is moveable, upon commencement of the capturing of the second video stream 922, movement of the second video camera may be automatically controlled by body or facial movement 928 and/or manually controlled by receipt of user navigation input 930. Modules such as a movement processing module 128 (FIG. 1) can provide instructions to a processor to process body or facial movement 928 detected by the image sequence of the first video camera 104 to generate a command to change the pointing direction of a moveable second video camera 206.

To process body or facial movement 928 multiple video frames and generic models can be used to construct quadrilateral or rectangular 3D mesh tracking of a subject such as a user whose image is being captured by the first video camera pointing in his or her direction. Real-time motion vectors provided by standard video encoders are used to estimate and track several defined points on the mesh. With this data, positions and expressions of the subject are tracked in real-time to determine their body and facial movements. In this manner, facial movement such as eye movement and body movement such as head and/or arm movement in a particular direction can cause the movable second video camera to change its pointing direction to the same direction as the movement of the user.

Modules such as a user navigation input module 130 (see FIG. 1) can provide instructions to a processor to process manual navigation input 930 for movement instructions from the user. For example, the keypad 112 and its set of navigation buttons 114 (see FIG. 1) can provide a manner in which the user can input navigation controls to command the second video camera 206 (see FIG. 2) to change its pointing direction. Any arrangement or configuration that provides manual input including keys or a mouse control is within the scope of this discussion. With less motion introduced by the manual input to the keys or mouse control, less motion compensation may be needed. On the other hand, in an automatic embodiment of changing the pointing direction of the second video camera, additional motion of the handheld device is less likely generated.

The first video stream or its resultant first video stream may be encoded 934 according to the instructions of the encoding module 134. The second video stream can be captured 931 in any of the manners described above so that it may be received by a processor 932 and encoded 935 according to the instructions of the encoding module 134. The encoded video streams the can be combined by multiplexing 936 to form a single video stream according to instructions of multiplexing module 136 (see FIG. 1). The single video stream may be transmitted 938 according to instruction of the transmission module 138. As mentioned above, the two video streams may also be transmitted independently without their being multiplexed (see FIG. 4). Even though both video streams are transmitted independently, the first video signal of the user is mirrored, as it is in the combined video stream, so the body gestures and eyes are pointing in the proper direction of the events of the second video signal as required by recipient who may view both video signals simultaneously.

As discussed in detail above, two video cameras of a mobile communication that can operate simultaneously may be useful in certain use cases. A mobile communication device having two video cameras in a single device that operate simultaneously can allow a user to capture a sequence of images of a scene or object, and simultaneously capture a sequence of images of himself or herself speaking about the scene or object. In real-time, or at a later time, the device can transmit the data from both image sequences together or separately but simultaneously to one or more recipients. A single mobile communication device that includes two video cameras could be useful in a number of use-cases unique to mobile communication devices with a capability that cannot be achieved with single and separate and remote video cameras.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. A video telephony enabled mobile communication device, comprising:
    a first video camera pointing in a first direction and configured to generate a first video signal;
    a second video camera pointing in a second direction and configured to generate a second video signal, wherein the second camera is movable and configured to point in a plurality of pointing directions;
    a processor configured to receive the first video signal and the second video signal and to encode the first video signal and the second video signal in real-time for simultaneous transmission; and
    a user interface configured to process a body movement or a facial movement to determine the pointing direction of the second camera.

2. The device of claim 1, wherein the processor is configured to multiplex the first video signal and the second video signal to form a combined video signal for transmission by the transceiver.

3. The device of claim 2, wherein the combined video signal comprises a split screen, picture-in-picture, or picture-next-to-picture formats.

4. The device of claim 1, wherein:
    the first video signal comprises a captured image;
    the processor is further configured to provide from the first video signal a resultant video signal corresponding to a mirror image of the captured image.

5. The device of claim 1,
    wherein the pointing directions are navigable by the user interface.

6. A method in a video telephony enabled mobile communication device, the method comprising:
    receiving a first video signal from a first video camera of the mobile communication device;
    receiving a second video signal from a second video camera of the mobile communication device, the second camera is movable;
    pointing the second camera in a plurality of pointing directions;
    processing a body movement or a facial movement to produce user input to point the second camera in the plurality of pointing directions; and
    encoding the first video signal and the second video signal in real-time for simultaneous transmission.

7. The method of claim 6, further comprising:
    multiplexing the first video signal and the second video signal to form a combined video signal for transmission.

8. The method of claim 7, wherein multiplexing forms a combined video signal having a split screen, picture-in-picture, or a picture-next-to-picture formats.

9. The method of claim 6, further comprising:
    capturing image by the first video signal;
    processing the image to provide from the first video signal a resultant video signal corresponding to a mirror image of the captured image,
    multiplexing the resultant video signal and the second video signal to form a combined video signal for transmission of the combined video signal.

10. The method of claim 6, further comprising:
    receiving user input from a navigation circle to point the second camera in the plurality of pointing directions.

11. The method of claim 6, further comprising:
    processing a body movement or a facial movement to produce user input to point the second camera in the plurality of pointing directions.

12. A mobile communication device for dual video telephony, the device comprising:
    a housing;
    a fixed video camera configured to point in a first direction with respect to the housing and to generate a first video signal;
    a movable video camera configured to point in a plurality of second directions with respect to the housing and to generate a second video signal; and
    a processor configured to process a body movement or a facial movement to generate a command to the moveable video camera to point in a particular direction.

13. The device of claim 12, further comprising:
    a user interface configured to generate signals to control the direction in which the moveable video camera points;
    a navigation circle configured to receive input and generate a navigation signal; and
    a processor configured to receive the navigation signal and send a command to the movable video camera to point in a particular direction.

14. The device of claim 12, further comprising:
a processor configured to receive the first video signal and the second video signal and to encode at least one of the first video signal and the second video signal to form an encoded video signal; and
a transceiver configured to transmit the encoded video signal.

15. The device of claim 14, wherein the processor is configured to multiplex the first video signal and the second video signal to form a combined video signal for transmission by the transceiver.

16. The device of claim 12 wherein the processor is further configured to provide from the first video signal a resultant video signal corresponding to a mirror image of a captured image.

* * * * *